(12) United States Patent
Anderson et al.

(10) Patent No.: US 8,437,730 B2
(45) Date of Patent: May 7, 2013

(54) ADAPTIVE QUALITY OF SERVICE FOR WIRELESS COMMUNICATION DEVICE

(75) Inventors: Jon J. Anderson, Boulder, CO (US); Francis M. Ngai, Louisville, CO (US); Glenn A. Salaman, Lafayette, CO (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 12/787,991

(22) Filed: May 26, 2010

(65) Prior Publication Data

US 2011/0294456 A1 Dec. 1, 2011

(51) Int. Cl.
*H04M 11/04* (2006.01)

(52) U.S. Cl.
USPC ........................................ 455/404.1; 455/405

(58) Field of Classification Search .............. 455/404.1, 455/404.2, 405, 411, 414.1, 574; 370/250, 370/328, 352
See application file for complete search history.

(56) References Cited

U.S. PATENT DOCUMENTS

| | | | |
|---|---|---|---|
| 5,930,684 | A | 7/1999 | Keskitalo et al. |
| 6,697,953 | B1 | 2/2004 | Collins |
| 2003/0073424 | A1 | 4/2003 | Nunally |
| 2005/0085253 | A1 | 4/2005 | Mansour |
| 2005/0197080 | A1 | 9/2005 | Ulupinar et al. |
| 2006/0223465 | A1 | 10/2006 | Akiba et al. |
| 2007/0281709 | A1 | 12/2007 | Timms |
| 2008/0102815 | A1* | 5/2008 | Sengupta et al. ............. 455/424 |
| 2010/0135205 | A1* | 6/2010 | Li et al. ........................ 370/328 |

FOREIGN PATENT DOCUMENTS

| | | |
|---|---|---|
| EP | 1722587 A1 | 11/2006 |
| GB | 2381418 A | 4/2003 |
| WO | WO9740638 A1 | 10/1997 |
| WO | WO0041417 A1 | 7/2000 |
| WO | WO2009105352 A1 | 8/2009 |

OTHER PUBLICATIONS

Bae B., et al., "On CDMA2000 evolution—Upper layer enhancements for fast call setup in CDMA2000 revision D", IEEE Communications Magazine, IEEE Service Center, Piscataway, US, vol. 43, No. 4, Apr. 1, 2005, pp. 57-64, XP011130590, ISSN: 0163-6804, DOI: 10.1109/MCOM.2005.1421904 p. 57-p. 58, col. 1 p. 59, col. 2-p. 60, col. 2 p. 63 figure 3; table 1.
International Search Report and Written Opinion—PCT/US2011/037413—ISA/EPO—Jan. 24, 2012.
Qualcomm: "What's Next for CDMA", Nov. 1, 2009, XP002665575, Retrieved from the Internet: URL:http://www.google.nl/url''sa=t&rct=j&q=switching%20hybrid%2Omode%20smiultaneous%20mode%20svdo%20evdo&source=web&cd=2&ved=0CB8QFjAB&url=http%3A%2F%2Fwww.qualcomm.ccom%2Fdocuments%2Ffiles%ZFwhats-next-cdma.pdf&ei=29jgTtmJIHO-gbH16y8DA&usg=AFQjCNHewyipnzIDlo3xGIAXK56u_mtWnw [retrieved on Dec. 8, 2011] paragraph [0007]; figure 11.

* cited by examiner

*Primary Examiner* — Sam Bhattacharya
(74) *Attorney, Agent, or Firm* — Kevin T. Cheatham

(57) ABSTRACT

The subject matter disclosed herein relates to adaptive quality of service for a wireless communication device.

50 Claims, 9 Drawing Sheets

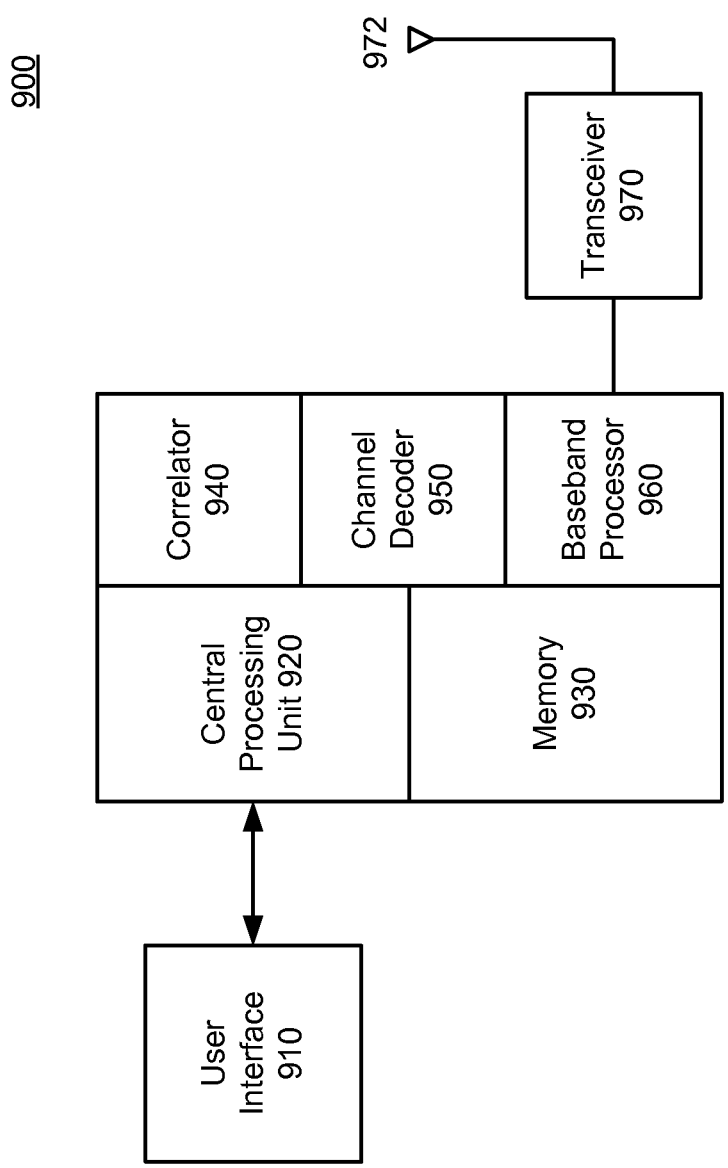

ADAPTIVE QUALITY OF SERVICE FOR WIRELESS COMMUNICATION DEVICE

BACKGROUND

1. Field

The subject matter disclosed herein relates to adaptive quality of service for a communication device in a wireless communication system.

2. Background

Wireless communication devices such as mobile stations, for example, may receive wireless signals from and/or may transmit wireless signals to one or more base stations. A mobile station may operate as part of a cellular communication system, and may exchange wireless signals with a base station if engaged in a telephone call, for example.

If a mobile station is not actively engaged in a call, it may be in an idle slotted state in order to preserve battery power. While in the idle state, the mobile station may monitor a paging channel by periodically turning on its receiver to determine whether the mobile station has been paged. A page message transmitted by a base station may indicate to the mobile station that there is an incoming call or a message for the mobile station. In the event of page message indicating an incoming call, the mobile station may establish active communication with the base station, and that communication may remain active while the mobile station is engaged with the call.

As previously mentioned, if a mobile station is not actively engaged in a call, it may be in an idle state in order to preserve battery power. In general, the mobile station's battery life may be determined, at least in part, by how much time the receiver and transmitter circuits of the mobile station are turned on. The more time the mobile station is actively monitoring the system, the shorter the battery life. Conversely, the more time the receiver and transmitter circuits of the mobile station are off, the longer the battery life. While in the idle slotted state, if the mobile station receiver is turned on less frequently and/or for shorter periods of time, battery life may be extended accordingly. However, extending battery life in this manner may negatively impact quality of service (QoS) as it relates to call performance.

Mobile stations are typically manufactured and delivered to consumers with a set of pre-selected parameters related to call performance and QoS. The mobile station manufacturer and/or cellular network provider, for example, may attempt to create a set of pre-selected parameters that may provide an advantageous balance of call performance and battery life. However, there are a wide range of operating environments in which a mobile station may operate. Further, the operating environment for any given mobile station may not remain constant as conditions change from moment-to-moment and over time. Also, individual consumers may have widely varying usage patterns one from another, and, further still, the consumer's usage patterns may change over time, for example.

SUMMARY

In an aspect, one or more wireless signals may be received at a wireless communication device, and one or more attributes of an operating environment for the wireless communication device may be determined based at least in part on the wireless signals. Also, at least in part in response to said determination of the one or more attributes of the operating environment, one or more quality of service parameters of the wireless communication device may be adjusted. In another aspect, the one or more quality of service parameters may be related at least in part to one or more of a frequent calls mode of operation, a dual subscription mode of operation, or an emergency alert mode of operation. Of course, these are merely examples of particular implementations, and claimed subject matter is not limited in this respect.

BRIEF DESCRIPTION OF THE DRAWINGS

FIG. 9 is a schematic block diagram of an example wireless communication device.

DETAILED DESCRIPTION

Figure 1:
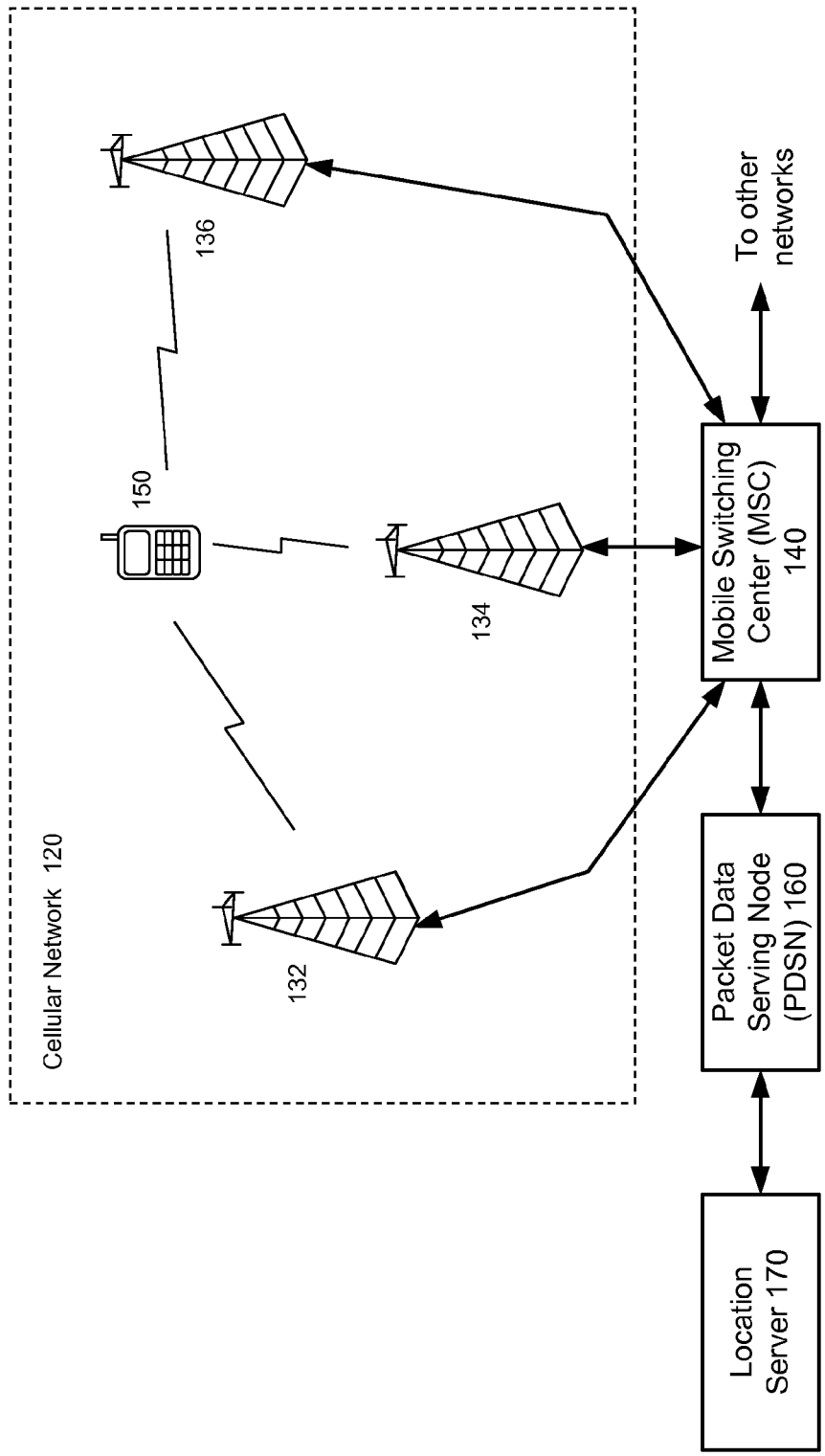
FIG. 1 is a schematic block diagram of an example cellular network.

As discussed above, wireless communication devices such as mobile stations, to name merely one example, may be manufactured and delivered to consumers with pre-selected parameters related to call performance and quality of service (QoS). Mobile station manufacturers and/or cellular network providers, for example, may pre-select the parameters in an effort to provide an advantageous balance of call performance and battery life. However, as also mentioned above, there are a wide range of operating environments in which a wireless communication device such as a mobile station may operate, including consumer preferences and usage patterns, and it may be difficult to provide a set of QoS parameters that will provide desirable balances of call performance and battery life across a wide range of wireless communication device users and across a wide range of operational conditions not related to the users. As further mentioned above, an operating environment for any given wireless communication device may not remain constant from moment-to-moment or over time. And, as also mentioned previously, individual consumer's usage patterns may vary widely one from another, and their respective usage patterns may change over time, as well.

In an aspect, in order to alleviate at least some of the difficulties mentioned above, a wireless communication device may observe operating conditions, including user preferences, for example, and may adjust one or more parameters related to wireless communication device operation in order to better balance call performance and battery life to provide a more advantageous quality of service (QoS) in light of the observed operating conditions. In an aspect, the wireless communication device may receive one or more wireless signals, and one or more attributes of an operating environment for the wireless communication device may be determined based at least in part on the received one or more wireless signals. Also, at least in part in response to said determination of the one or more attributes of the operating environment, one or more QoS parameters of the wireless communication device may be adjusted. In another aspect, the one or more QoS parameters may be related at least in part, for example, to one or more of a frequent calls mode of operation, a dual subscription mode of operation, or an emergency alert mode of operation. Such example modes of operation and various associated example QoS parameter adjustments are discussed more fully below in connection with particular implementations.

As mentioned previously, a wireless communication device such as a mobile station may have default or preselected parameters that may not be advantageous for every user under every condition. Various examples described herein utilize what may be referred to as adaptive QoS, wherein the wireless communication device may recognize whether to adjust a QoS parameter depending at least in part on an observed operating environment. As used herein, the term "Quality of Service" (QoS) may refer to one or more performance attributes for a wireless communication device that may be perceived by a user in operating the wireless communication device. Such performance attributes may include, but are not limited to, rate of calls successfully completed, perceived time needed to place a call, and battery life, for example. As also used herein, the term "QoS parameter" refers to any operating parameter that may be adjusted in a wireless communication device that may affect QoS of the wireless communication device. In addition to the QoS aspects mentioned above, QoS parameters in accordance with claimed subject matter may include parameters related to data latency and/or data throughput, for example. Such data latency and/or data throughput parameters may, in some implementations, be negotiated between entities in a network, such as between a mobile station and a base station and/or access point, for example. However, the scope of claimed subject matter is not limited in these respects.

Adaptive QoS processes may comprise, as previously mentioned, determining an operating environment for a wireless communication device, and adjusting one or more QoS parameters based at least in part on the determined operating environment. As used herein, the term "operating environment" may refer to conditions related to wireless signal transmission and/or reception that may be experienced by a wireless communication device. The operating environment may be described by one or more attributes such as, for example, an amount of wireless signals received at the wireless communication device over a given period of time, the types of received wireless signals, the respective perceived strengths of the received signals, an amount of wireless transmitters transmitting the received signals, the identities of any observed wireless communication network providers, the types of any observed cellular communications network protocols, a number of received voice calls for a given period of time, a number of voice calls initiated by the wireless communication device for a given period of time, a frequency and/or magnitude of changes in position location of a wireless communication device such as a mobile station, etc. Of course, these are merely examples of attributes that may describe an operating environment, and the scope of claimed subject matter is not limited in this respect.

In an aspect, adaptive QoS processes may seek to balance seemingly opposing goals of improving call performance and increasing standby time to improve battery life. For example, in the case of a wireless communication device operating as part of a code division multiple access (CDMA) wireless communications network such as, for example, a CDMA2000 communications network, to increase standby time the wireless communication device should wake up for as short a time as possible and as infrequently as possible to check for paging signals. To improve call performance, however, it may be advantageous to increase the amount of time a receiver circuit in the wireless communication device is enabled to check for paging signals, and/or increase the frequency with which the wireless communication device enables the receiver circuit to check for the paging signals. Of course, the amount of time the wireless communication device enables the receiver circuit and the frequency with which the wireless communication device enables the receiver circuit are merely examples of parameters that may be adjusted to make changes to the wireless communication device's quality of service, and the scope of claimed subject matter is not limited in this respect.

In other examples, there may be any of a wide range of parameters that may be analyzed and/or adjusted in an effort to improve QoS depending at least in part on the operating environment observed by the wireless communication device. Adaptive QoS processes described herein may be thought of as having a multi-dimensional parameter space that may be adjusted in any dimension depending on an observed operating environment of a wireless communication device. In an aspect, the operating environment may include one or more preferences of a user. For merely one example, a particular user may not care about battery life, but may instead wish to improve call performance, which for merely one example may comprise decreasing the amount of time required to connect a call. For another example, improved call performance may comprise decreasing the chance that a call may be dropped prematurely. Of course, these are merely examples aspects of improving call performance, and the scope of claimed subject matter is not limited in this respect.

As previously mentioned, an operating environment for a wireless communication device may include one or more preferences of a user. The user's preference may be taken into account in determining if adjustments should be made to any QoS parameters. The user, in an aspect, may input one or more preferences by way of a user interface provided on the wireless communication device. For example, the user may make selections via a menu provided as part of a graphical user interface comprising, for example, a touch screen or other display and input device. Of course, these are merely examples of how a user may provide input to a wireless communication device adaptive QoS process, and the scope of claimed subject matter is not limited in this respect.

FIG. 1 is a schematic block diagram of a cellular network 120 in communication with a wireless communication device which for this particular implementation comprises a mobile station 150. Cellular network 120 for this example may provide voice communication for a number of mobile stations including mobile station 150, for example. Cellular network 120 may comprise any of a number of cellular network types, several examples of which are described below. For one example, cellular network 120 may comprise a CDMA2000 communications network, although the scope of claimed subject matter is not limited in this respect. Cellular network 120 for this example system comprises base stations 132, 134, and 136 that provide communication for a number of wireless terminals such as, for example, mobile station 150. For simplicity, only a few base stations 132, 134, and 136 are depicted and one mobile station 150 is depicted in FIG. 1. Of course, other examples may include additional numbers of base stations, and the configuration of base stations depicted in FIG. 1 is merely an example configuration. Also, cellular network 120 is merely an example wireless communications system, and the scope of claimed subject matter is not limited in this respect.

As used herein, the term "base station" is meant to include any wireless communication station and/or device typically installed at a fixed terrestrial location and used to facilitate communication in a wireless communications system, such as, for example, a cellular network, although the scope of claimed subject matter is not limited in this respect. In another aspect, base stations may be included in any of a range of electronic device types. In an aspect, a base station may comprise a wireless local area network (WLAN) access point, for example. Such a WLAN may comprise an IEEE 802.11x network in an aspect, although the scope of claimed subject matter is not limited in this respect.

As used herein, the term "wireless communication device" refers to a device utilized to facilitate communication in a wireless communication system. Example wireless communication systems in which the a wireless communication device may be utilized may include cellular networks and WLANs, although the scope of claimed subject matter is not limited in this respect. Various example wireless communication systems are mentioned below.

As used herein, the term "mobile station" (MS) refers to a wireless communication device that may from time to time have a position location that changes. The changes in position location may comprise changes to direction, distance, orientation, etc., as a few examples. In particular examples, a mobile station may comprise a cellular telephone, user equipment, laptop computer, other personal communication system (PCS) device, personal digital assistant (PDA), personal audio device (PAD), portable navigational device, and/or other portable communication devices. A mobile station may also comprise a processor and/or computing platform adapted to perform functions controlled by machine-readable instructions. Although example implementations described herein utilize one or more mobile stations, the scope of claimed subject matter in not limited in this respect.

A mobile switching center (MSC) 140 for this example may be coupled to base stations 132, 134, and 136, and may further couple to other systems and networks, such as a public switched telephone network (PSTN), a packet data serving node (PDSN) 160, and so on. MSC 140 for this example provides coordination and control for the base stations coupled to it and further controls the routing of data to/from the mobile stations served by these base stations. For the example depicted in FIG. 1, PDSN 160 may couple MSC 140 to location server 170.

Figure 2:
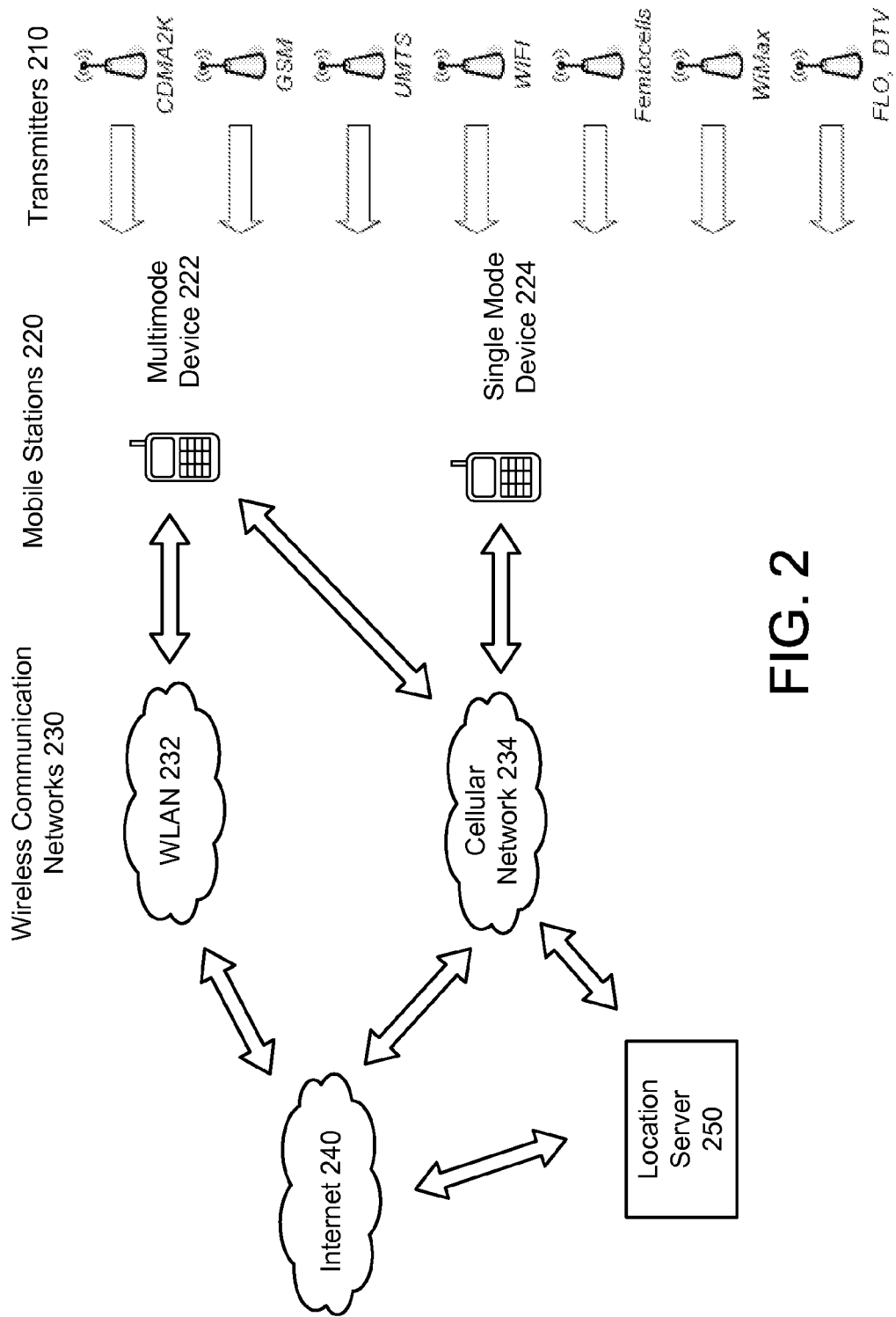
FIG. 2 is an illustration depicting example mobile stations receiving wireless signals from a number of example transmitters.

FIG. 2 is an illustration depicting example mobile stations 220 receiving wireless signals from a wide range of transmitters 210. Mobile stations 222 and 224 for this example also communicate with an location server 250 via one or more wireless communication networks 230, including cellular network 234 and a wireless local area network (WLAN) 232, and via Internet 240. For this example, mobile station 222 represents a multi-mode device that may support communication with both a packet-switched wireless local area network (WLAN) 232 and a cellular network 234. Of course, these are merely examples of the types of wireless communications networks with which a multimode device may communicate, and the scope of claimed subject matter is not limited in this respect. Also for this example, mobile station 224 represents a single-mode device that may support communication with cellular network 234. Again, the cellular network is merely one example of a wireless communication network with which a mobile station may establish communication.

Although the example of FIG. 2 depicts two mobile stations, in practice a wide variety of mobile station types exhibiting a wide range of different functionalities and/or usage patterns may be utilized to communicate with a large variety of potential network types. Therefore, as described previously, it may be advantageous to adapt QoS parameters according to operational environment features observed by a mobile station in order to provide consumers with improved experiences in interacting with such mobile stations.

In an aspect, a transmitter type may be defined according to signal frequency or band class. In another aspect, the type of transmitter may be defined according to network provider or carrier. Of course, these are merely examples of how a transmitter type may be defined, and the scope of claimed subject matter is not limited in these respects. Transmitters 210 for the example depicted in FIG. 2 may comprise any of a wide range of transmitter types for a similarly wide range of network types. As previously mentioned, a variety of example network types that may utilized in connection with example implementations described herein are described below.

Figure 3:
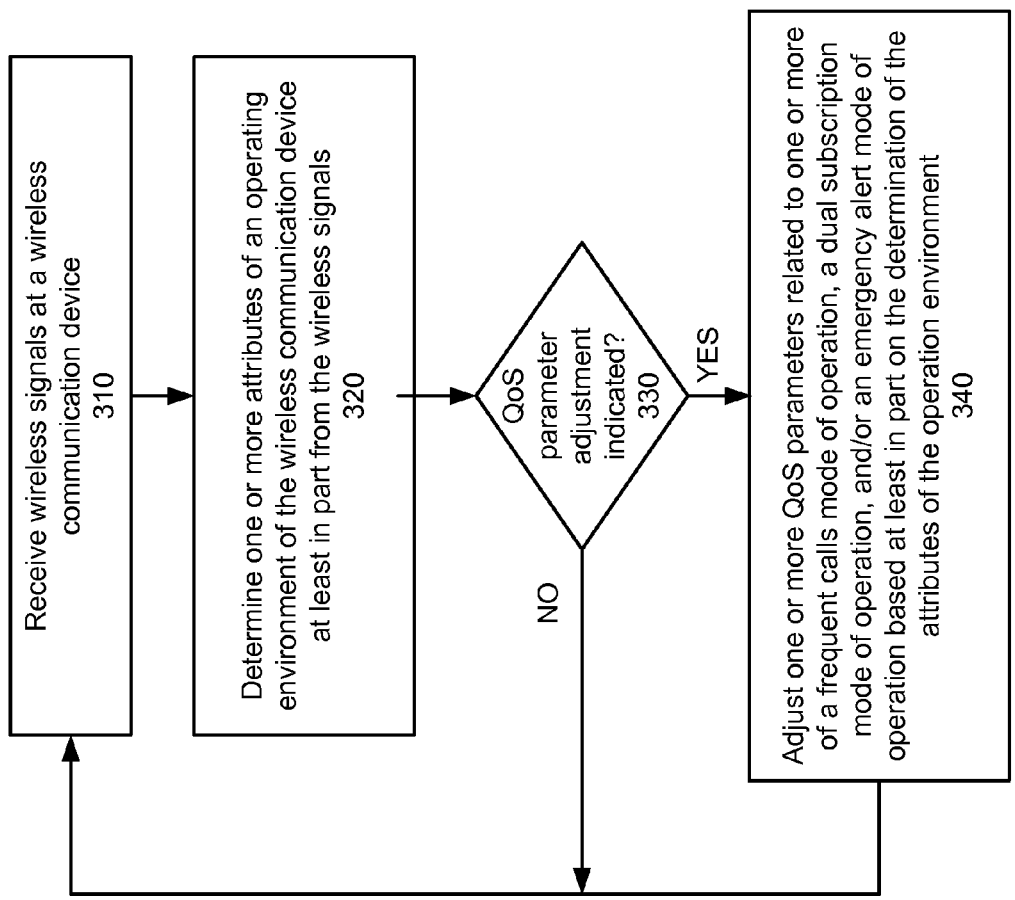
FIG. 3 is a flow diagram of an example process for adaptive quality of service for a wireless communication device.

FIG. 3 is a flow diagram of an example process for adaptive QoS for a wireless communication device. As previously mentioned, one example wireless communication device comprises a mobile station, although the scope of claimed subject matter is not limited in this respect, At block 310, a wireless communication device may receive one or more wireless signals at block 310. The wireless communication device, in an aspect, may obtain measurements from the received wireless signals, or may otherwise glean information from the received wireless signals in order to observe operating conditions related to an operating environment for the wireless communication device. The operating environment for the wireless communication device may further include operating characteristics of a battery for the wireless communication device such as the amount of charge left on the battery, for example. At block 320, one or more attributes of the operating environment of the wireless communication device may be determined based, at least in part, on the information gleaned from the received wireless signals. At block 330, a determination may be made as to whether one or more QoS parameters ought to be adjusted. The determination as to whether one or more QoS parameters ought to be adjusted may be based, at least in part, on attributes determined from the wireless signals at block 320. If an adjustment to one or more QoS parameters is indicated at block 330, one or more QoS parameters may be adjusted based at least in part on the determination of the attributes of the operating environment described at block 320. If no such adjustments are indicated at block 330, the process for this example returns to block 310 where additional information may be gleaned from the previously received wireless signals and/or from additional wireless signals received at the wireless communication device. As mentioned previously, QoS parameter adjustments may also take into consideration any preferences specified by a user. However, the scope of claimed subject matter is not limited in this respect. Examples in accordance with claimed subject matter may include all, less than, or more than blocks 310-340. Also, the order of blocks 310-340 is merely an example order, and the scope of claimed subject matter is not limited in this respect.

Figure 4:
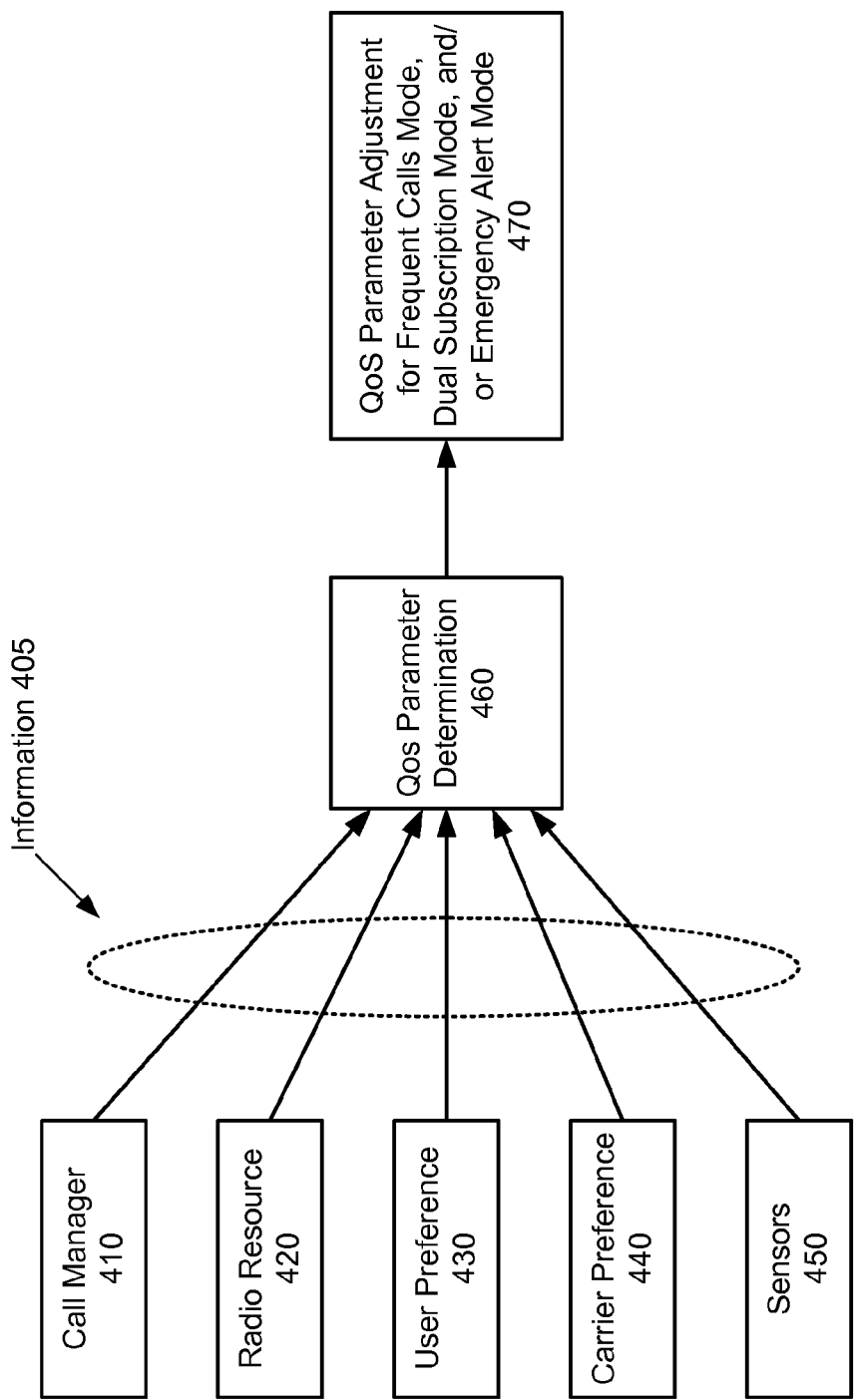
FIG. 4 is a schematic block diagram of an example process for determining a quality of service parameter to adjust for a wireless communication device.

FIG. 4 is a schematic block diagram of an example process for determining a quality of service parameter to adjust. As depicted in FIG. 4, a QoS parameter adjustment determination may take into account a wide range of types of information 405 from any of a wide range of sources. For example, a call manager 410, which for one example may comprise a software agent executed on a processor in a mobile station, for example, may track information such as frequency of calls made and/or received, frequency of short message service (SMS) messages sent/received, a count and/or frequency of emergency calls, recent roaming systems observed, etc. Of course, this listing is merely an example listing of information that may be tracked, and the scope of claimed subject matter is not limited in this respect. Similarly, a radio resource 420, which for an example may comprise at least in part a radio frequency receiver and a transmitter for the mobile station, may track recent and/or current wireless channel conditions. Radio resource 420 may also track recently observed and active sectors, visible roaming sectors, time spent out of service, quick paging channels and/or paging channels observed, and access probe attributes. Of course, these are merely examples of information that may be tracked by radio resource 420, and the scope of claimed subject matter is not limited in this respect.

In another aspect, and as previously mentioned, user preferences may be taken into account in adjusting QoS parameters as depicted by user preference box 430. As previously indicated, some users may be willing to trade off battery performance for improved call performance. For example, it may be more important for one user to miss as few calls as possible, despite any potential impact to battery life. Further, as indicated by carrier preference box 440, a wireless network provider may indicate preferences in setting QoS parameters in mobile stations that participate in the provider's network. Additionally, information may be provided by sensors 450 for determining QoS parameter adjustments. Some example sensors may be implemented in a mobile station may include accelerometers, gyroscopes, altimeters, barometric pressure sensors, etc. Such sensors may track heading, velocity, altitude, orientation, etc., of the mobile station over a period of time and may also be used in determining a position location of the mobile station. For another example, a mobile station may comprise a battery sensor to sense the amount of charge remaining in a battery. For this example, information 405 may comprise information related to the amount of charge remaining in the battery. Of course, these are merely example sensors and example types of information that may be provided by sensors located in a mobile station, and the scope of claimed subject matter is not limited in these respects. Also, in another aspect, other techniques for determining a position location of the mobile station may utilize information from satellite positioning system (SPS) signals and/or cellular network signals, although again, the scope of claimed subject matter is not limited in these respects.

For the example depicted in FIG. 4, information 405 provided by the various sources 410-450 may be provided to a QoS parameter determination unit 460, which, for this example, may be implemented as a software agent executed by a processor in the mobile station. Of course, other example implementations may utilize hardware circuitry for unit 460. Still other examples may utilize a combination of hardware and software. QoS parameter determination unit 460 for the present example may receive information 405 and may determine which one or more QoS parameters to adjust in order to provide an advantageous QoS in accordance with an observed operating environment. QoS determination unit 460 may also determine which one or more QoS parameters to adjust based at least in part on user and/or carrier preferences. QoS parameter determination unit 460 is not limited to any particular technique in analyzing information 405 and in determining QoS parameters to adjust. The adjustment of the one or more determined QoS parameters is represented by box 470 in FIG. 4.

As mentioned above, adaptive QoS techniques may find utility in several example modes of operation, including, but not limited to, a "frequent calls" mode of operation, an "emergency alert" mode of operation, and a "dual subscription" mode of operation. In an aspect, adaptive QoS techniques may be applied to one or more of the example modes of operation.

In an aspect, a "frequent calls" mode of operation may be characterized, at least in part, by an amount of time a wireless communication device spends engaged in active calls over a specified period of time. In another aspect, a threshold amount of time may be specified wherein if the threshold amount of time is exceeded for the specified period of time, a frequent calls mode may be indicated. A frequent calls mode of operation may also be described as a wireless communication device mode of operation characterized by consecutive or frequent occurrences of a duration of time between the end of one call and the beginning of another being below a specified threshold. If a wireless communication device is operating in a frequent calls mode of operation, power consumption for the wireless communication device may be dominated by the active calls. In such a circumstance, it may be palatable to the wireless communication device user to raise power consumption during the relatively short periods of time between calls to enable improved call performance. For example, call performance may be improved by increasing the frequency with which the mobile station enables a receiver circuit to check for incoming calls via paging signals and/or by increasing the amount of time the receiver is enabled to be able to receive the paging signals. In an aspect, the term "enable" as used herein and as it relates to a receiver circuit may refer to "turning on" the receiver circuit and/or to applying power to the receiver circuit. In another aspect, to "enable" a receiver circuit may comprise applying a clock signal to the receiver circuit and/or increasing a frequency of a clock signal applied to the receiver circuit. However, these are merely examples of enabling a receiver circuit of a wireless communication device, and the scope of claimed subject matter is not limited in this respect. In another aspect, the changes to the frequency and amount of time spent with receivers enabled when the mobile station is in an idle state may be made dynamically, depending on whether or not the frequent calls mode of operation is detected. For example, if the wireless communication device is not in the frequent calls mode of operation, the frequency with which the receiver circuitry is enabled and the amount of time the receiver is enabled may return to default values intended to balance battery life and call performance.

Other parameters than the frequency and amount of time the receivers are enabled during an idle state may be adjusted in response to a detection of a frequent calls mode of operation. For example, in response to a detection of the frequent calls mode, deeper searches may be performed for pilot signals. Deeper searches may include, in at least some aspects, increasing the time allocated for re-acquisition or to re-acquire the system after a sleep state, and may further include increasing coherent and/or non-coherent integration length for a CDMA signal. In another aspect, the slotted mode of operation may be exited in the case of a CDMA2000 cellular communication system to allow greater acquisition possibilities of paging signals. Operation in a non-slotted mode may result in the wireless communication device monitoring the system in a continuous fashion. For another example, transmitter power for the wireless communication device may be increased to improve the likelihood that access probe signals are received and recognized by one or more base stations. In yet another example, the wireless communication device may invoke additional demodulation enhancement techniques such as receive diversity or interference cancellation during acquisition, sync, idle, and access states. Receive diversity, for example, may improve network performance and/or user experience in 1× and EV-DO (Evolution Data Optimized). However, receive diversity, for example, utilizes multiple receive chains and therefore may tend to increase power consumption over the case of no receive diversity. These additional demodulation enhancement techniques may nominally be turned off due to tradeoffs with other QoS metrics. Of course, these are merely some example actions and/or adjustments that may be made in response to the wireless communication device entering a frequent calls mode of operation, and the scope of claimed subject matter is not limited to these specific examples.

As noted previously, one type of sensor that may be employed in an example implementation of a mobile station is a battery sensor to indicate the amount of charge remaining in the battery. In an aspect, if the battery sensor indicates that the remaining charge has fallen below a specified threshold, one or more QoS parameters may be adjusted in order to reduce power consumption. For example, because multiple active receive chains draw more power than a single receive chain, disabling receive diversity may reduce power consumption. For this example, if the battery sensor indicates that the remaining charge in the battery has fallen below the specified threshold, receive diversity may be disabled in order to reduce power consumption. In this manner, available talk time may be increased. For one example implementation, the threshold for remaining charge may be specified to be 50%, although the scope of claimed subject matter is not limited in this respect, and other implementations may utilize other threshold levels. Further, receive diversity is merely one example of functions and/or parameters related to QoS that may be adjusted in response to information provided by a battery sensor, and the scope of claimed subject matter is not limited in this respect.

Figure 5:
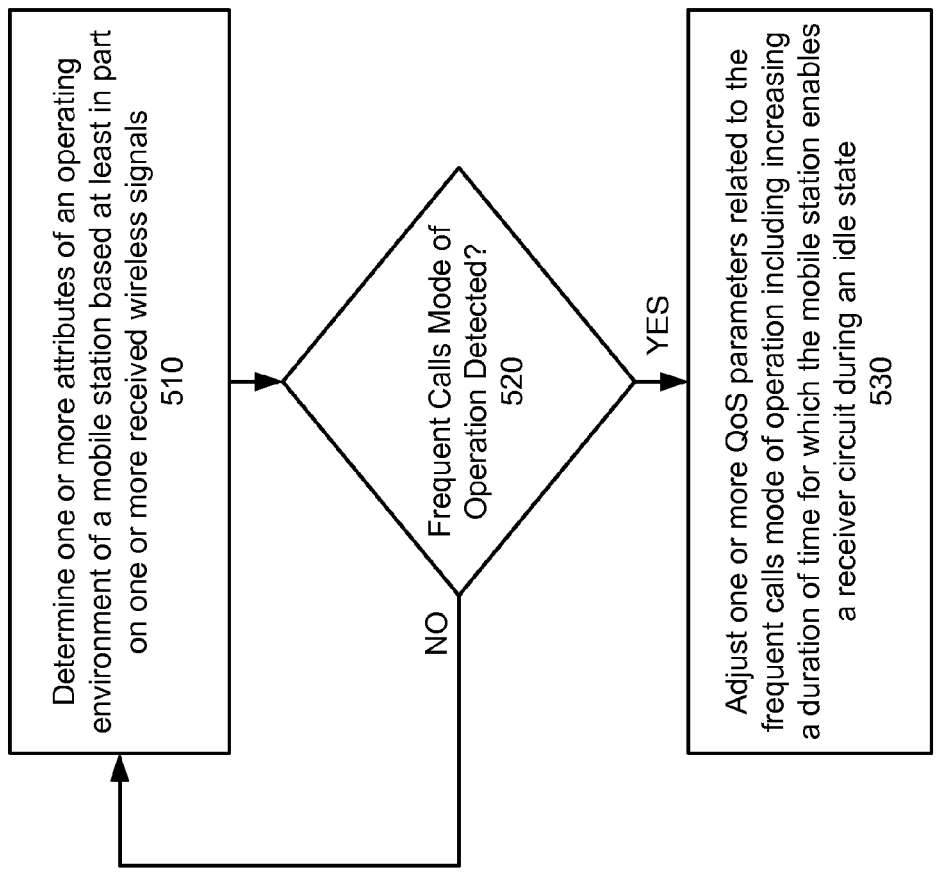
FIG. 5 is a flow diagram depicting an example process for adjusting one or more quality of service parameters in response to a detection of a frequent calls mode of operation for a wireless communication device.

FIG. 5 is a flow diagram depicting an example implementation of a process for adjusting one or more QoS parameters at least in part in response to a detection of a frequent calls mode of operation for a mobile station. At block 510, one or more attributes of an operating environment for the mobile station may be determined based at least in part on one or more wireless signals received at the mobile station. Block 520 indicates that a determination may be made as to whether the frequent calls mode of operation has been detected based at least in part on the one or more determined attributes of the operating environment. At least in part in response to a determination of the frequent calls mode of operation, one or more QoS parameters related to the frequent calls mode of operation may be adjusted. Such adjustments may include, for example, increasing a duration time for which the mobile station enables a receiver circuit during an idle state. Of course, as described above, any of a wide range of other adjustments in accordance with claimed subject matter are also possible.

In a further aspect, any or all of the QoS parameter adjustments described above in connection with the frequent calls mode of operation may be extended to "emergency alert" modes of operation. In a situation where an emergency call is to be made, such as in a "911" situation, if a wireless communication device detects a user dialing "911" or any other emergency number that may be programmed into the wireless communication device, call performance may trump concerns of battery life and power consumption. Therefore, it may make sense in such a situation to employ some or all of the adjustments mentioned above to help ensure a timely and reliably delivered emergency call. Such adjustments may also be employed in reverse-911 situations as well, where emergency services seek to quickly contact individuals or communities of individuals in the event of an emergency. In such a situation, the wireless communication device may recognize an incoming call as a reverse-911 call and may employ at least some of the adjustments described above, in one or more aspects.

Figure 6:
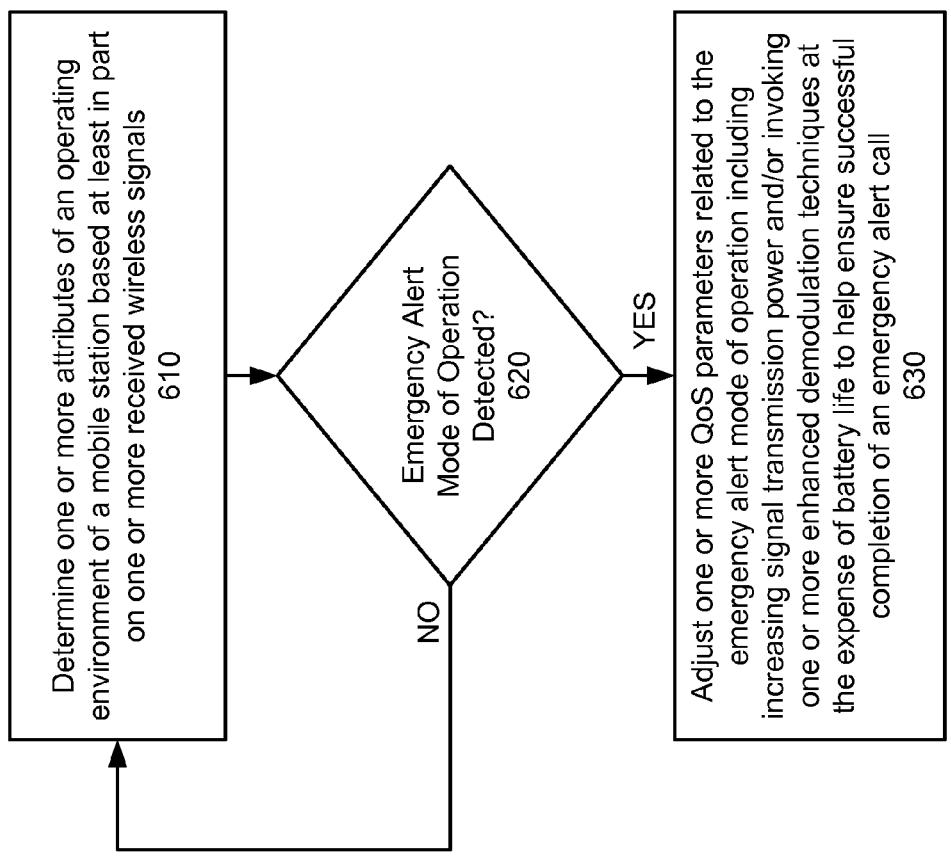
FIG. 6 is a flow diagram depicting an example process for adjusting one or more quality of service parameters in response to a detection of an emergency alert mode of operation for a wireless communication device.

FIG. 6 is a flow diagram depicting an example implementation of a process for adjusting one or more QoS parameters at least in part in response to a detection of an emergency alert mode of operation for a mobile station. At block 610, one or more attributes of an operating environment for the mobile station may be determined based at least in part on one or more wireless signals received at the mobile station. Block 620 indicates that a determination may be made as to whether the emergency alert mode of operation has been detected based at least in part on the one or more determined attributes of the operating environment. Such attributes may include a phone number being called that corresponds to an emergency response provider, to name merely one example. At least in part in response to a determination of the emergency alert mode of operation, one or more QoS parameters related to the emergency alert mode of operation may be adjusted. Such adjustments may include, for example, increasing transmission power for the phone call to the emergency response provider and/or invoking one or more enhanced demodulation techniques to help ensure successful completion of the call. Of course, as described above, any of a wide range of other adjustments in accordance with claimed subject matter are also possible. Additionally, such adjustments may be made at the expense of battery life in such a situation in order to help ensure the successful completion of the emergency alert call.

In a similar fashion, a user may express a preference for one or more phone numbers stored in a memory of the wireless communication device. If the wireless communication device places a call to and/or receives a call from a preferred number, the wireless communication device may adjust one or more QoS parameters to enhance call performance for the call involving the preferred number. In an aspect, a user may express his/her preference by providing an input to the wireless communication device by way of a user interface. In the case of a cellular telephone, the input may be made by the user interacting with a keypad or with a touch screen, to name but a couple of examples.

As previously mentioned, one possible mode of operation that may advantageously utilize adaptive QoS in wireless communication device such as a mobile station is a "dual subscription" mode of operation. A "dual subscription" mode refers to a situation where wireless communication device such as a mobile station is associated with more than one phone number, provider, and/or communication protocol. For example, one mobile station may be utilized by an individual user having two subscriptions that having two respective phone numbers. In another aspect, although the examples depicted herein refer to a "dual subscription" mode of operation, the scope of claimed subject matter is not limited to two subscriptions, numbers, providers, and/or protocols. Rather, the examples provided herein are restricted to two subscriptions, numbers, providers, and/or protocols for purposes of clarity of explanation. Embodiments in accordance with claimed subject matter may comprise two subscriptions, or may comprise less than two subscriptions, or may comprise more than two subscriptions.

In one example of a dual subscription mode of operation, a mobile device may be associated with two phone numbers. These numbers may be associated with two respective users, or may be utilized by a single user. For the present example, the two phone numbers may be serviced by a common cellular communications provider. However, in another example, the two numbers may be serviced by different providers using similar communication protocols. In a further example, the two numbers may be associated with different communication protocols. For example, one number may be associated with a cellular network based on a code division multiple access (CDMA) protocol such as CDMA 2000, while the other number may be associated with a cellular network based on a time division multiple access (TDMA) protocol, such as a Global System for Mobile Communications (GSM) protocol. However, these are merely example communications protocols that may be utilized in connection with any of the implementations described herein, and the scope of claimed subject matter is not limited in this respect. Other example communications protocols are described below.

Figure 7:
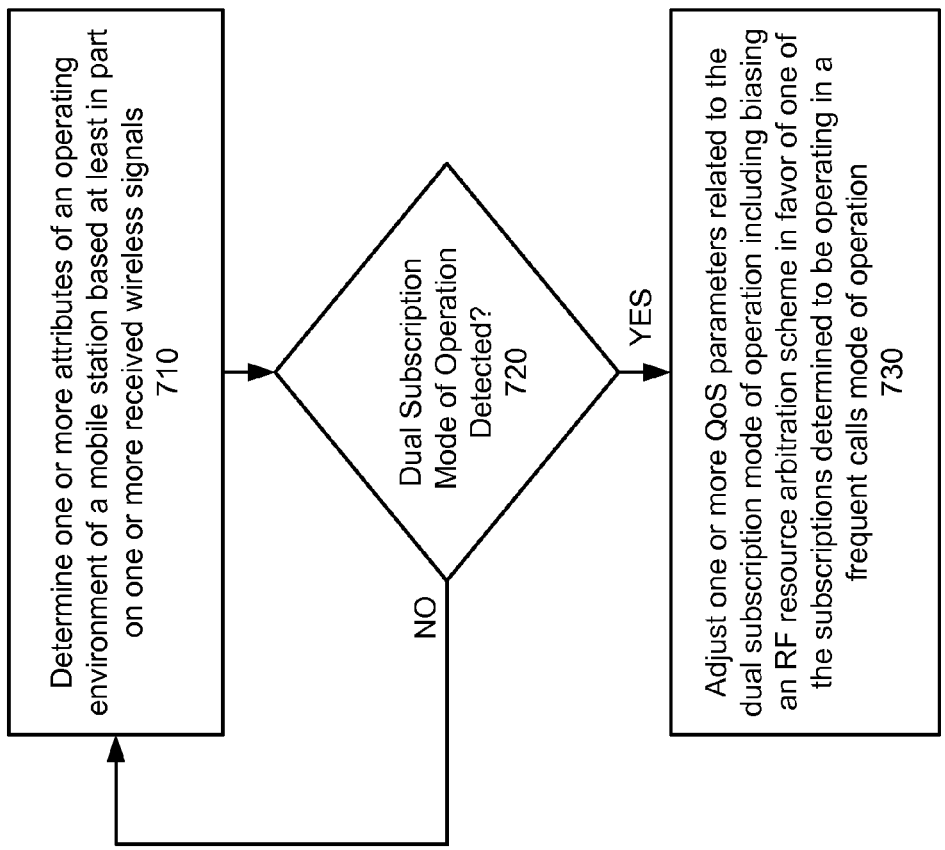
FIG. 7 is a flow diagram depicting an example process for adjusting one or more quality of service parameters in response to a detection of a dual subscription mode of operation for a wireless communication device.

FIG. 7 is a flow diagram depicting an example implementation of a process for adjusting one or more QoS parameters at least in part in response to a detection of a dual subscription mode of operation for a mobile station. At block 710, one or more attributes of an operating environment for the mobile station may be determined based at least in part on one or more wireless signals received at the mobile station. Block 720 indicates that a determination may be made as to whether the dual subscription mode of operation has been detected based at least in part on the one or more determined attributes of the operating environment. Such attributes may further be determined by observing configuration information stored at the mobile station, for another example. At least in part in response to a determination of the dual subscription mode of operation, one or more QoS parameters related to the dual subscription mode of operation may be adjusted. Such adjustments may include, for example, biasing a radio frequency (RF) resource arbitration scheme in favor of one of the subscriptions determined to be operating in a frequent calls mode of operation. Of course, as described above, and as further described below, any of a wide range of other adjustments in accordance with claimed subject matter may also be made.

For a mobile device operating in a dual subscription mode, it may be advantageous to implement any or all of the adaptive QoS techniques described above. However, due to the two subscriptions, many of the functions of the mobile station are shared between the two subscriptions. For example, a mobile station may comprise a single set of radio frequency (RF) resources, for example a single receiver circuit and a single transmitter circuit. To share the RF resources, the mobile station may arbitrate between the two subscriptions to manage utilization of the RF resources. As a further example, if both subscriptions are associated with a CDMA2000 cellular network provider, for example, each of the subscriptions may be assigned a respective slot in the CDMA2000 paging signal protocol. If the mobile station is in an idle state, the mobile station may awaken or enable a receiver circuit periodically to check for paging signals for both subscriptions. A subscription may make a request to an arbitrator unit in the mobile station to utilize the RF resources. For an example implementation, the arbitrator unit may comprise a software agent executed on a processor in the mobile unit, although the scope of claimed subject matter is not limited in this respect.

In another aspect, the arbitrator unit may be implemented in hardware, or in a combination of hardware and software.

In one example implementation comprising a mobile station, the arbitration unit may grant access to the RF resources in such a fashion that each subscription has an equal chance of gaining access to the RF resources. However, in an aspect, if the mobile station detects that one of the subscriptions is operating in a frequent calls mode as described previously, the arbitrator unit may bias the arbitration process in favor of the subscription operating in the frequent calls mode. This is the example depicted in FIG. 8.

Figure 8:
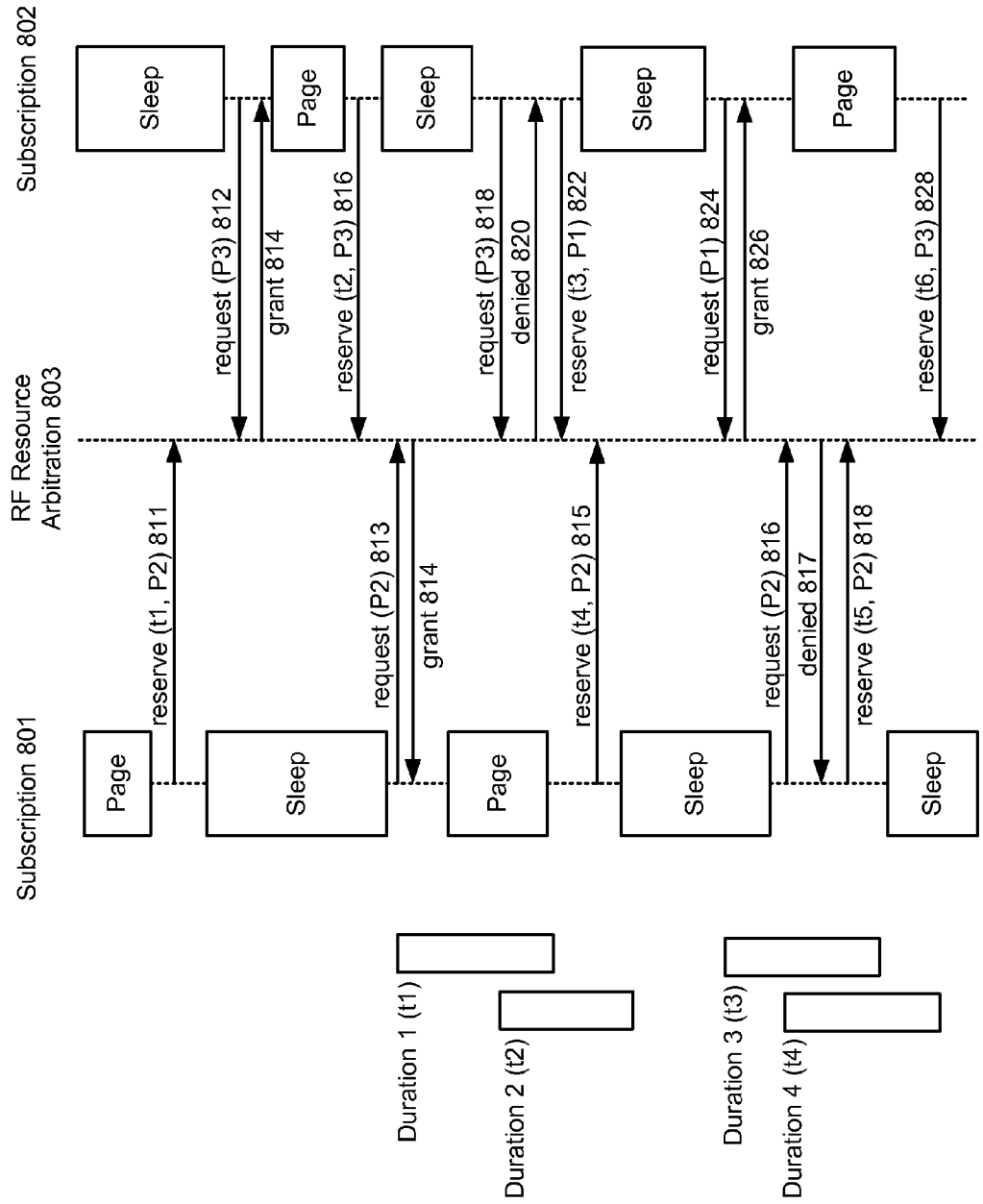
FIG. 8 is a schematic block diagram depicting an example dual subscription mode arbitration operation for a wireless communication device.

FIG. 8 is a schematic block diagram depicting an example arbitration process for an example dual subscription mode of operation for a mobile station such as mobile station 150. For the example arbitration process depicted in FIG. 8, it is assumed that each subscription is associated with the same communications network provider. However, as previously mentioned, the scope of claimed subject matter is not limited to subscriptions from the same provider. For the example of FIG. 8, various "page" and "sleep" periods of time are depicted. The "page" periods represent periods of time in which the mobile station enables its receiver and listens for a page signal indicating an incoming call. The "sleep" periods represent periods of time in which the mobile station does not have its receiver enabled. Of course, these are very general descriptions of actions that may occur during the depicted "page" and "sleep" periods, and the scope of claimed subject matter is not limited in this respect. Also, the illustration of FIG. 8 is meant to merely demonstrate one possible general order of arbitration events for one example, and is not meant to demonstrate precise timing relationships.

FIG. 8 illustrates example arbitration events for a subscription 801 and a subscription 802. Subscription 801 and subscription 802 as depicted in FIG. 8 represent software agents executed on a processor in a mobile station, although the scope of claimed subject matter is not limited to software and/or firmware implementations. Subscription 801 delivers a reserve signal 811 to an RF Resource Arbitration agent 803 indicating to the arbitration agent that subscription 801 intends to request utilization of the RF resource at a time t1. Reserve signal 811 also indicates to RF resource arbitration agent 803 that subscription 801 currently has a priority value of P2. For this example, subscription 801 may be considered to be a primary subscription, and subscription 802 may be considered to be a secondary subscription, for this example. At the beginning of the present example, subscription 801 has a priority value of P2 and subscription 802 had a priority value of P3. For the present example, P1>P2>P3. In the event of an arbitration conflict between the two subscriptions, the subscription with the higher priority value may be granted access to the RF resources.

At the end of the first "sleep" period for subscription 802, subscription 802 issues a request 812 to gain control of the RF resources. The request indicates that subscription 802 has a current priority value of P3 and a duration that would expire before time t1. A grant signal 814 is delivered from RF resource arbitration unit 803 to subscription 802, and subscription 802 gains control of the RF resources. Subscription 802 checks for a paging signal during the "page" period following grant 814. Following the page period, subscription 802 issues reserve signal 816, thereby indicating that subscription 802 has relinquished control of the RF resources, and indicates an intention to issue another request at time t2 with a priority value of P3.

At least in part in response to the end of the first "sleep" period for subscription 801, subscription 801 issues a request signal 813 with a priority value of P2, which is the current priority value for subscription 801. Subscription 802 had previously issued reserve signal 816 with a priority of P3 and indicating a time t2, and reserve signal 811 for subscription 801 indicated a priority of P2 and a time t1. The period of time beginning at t1, labeled Duration 1, may conflict with the period of time beginning at time t2, label Duration 2. Therefore, a decision is made by RF resource arbitration agent 803 depending on the current respective priority values of the subscriptions. For this decision, RF resource arbitration agent 803 issues grant signal 814 to subscription 801, and subscription 801 takes control of the RF resources at time t1 to perform the paging signal functions during the subsequent "page" period during duration 1.

While subscription 801 has control of the RF resources during duration 1, subscription 802 issues request signal 818, which results in a denied signal 820 from the arbitration agent 803. As previously discussed, RF resource arbitration agent 803 had recognized the conflict between reserve signal 811 and reserve signal 816, which would result in a conflict between duration 1 and duration 2, and the decision was made based on priority values to grant the RF resources to subscription 801 rather than to subscription 802.

At least in part in response to receiving the denied signal 820, subscription 802 may issue a reserve signal 822 for time t3. For this example, at least in part as a result of subscription 801 receiving grant signal 814, subscription 802 temporarily receives a priority value of P1. This may ensure that subscription 802 would not continue to be locked out of the RF resources if subscription 801 continues to request control of the RF resources. Also, subscription 801 issues a reserve signal 815 with a priority value of P2 for a time t4. RF resource arbitration agent 803, having received reserve signal 822 from subscription 802 and reserve signal 815 from subscription 801, recognizes a potential conflict between duration 3 beginning at a time t3 and duration 4 beginning at a time t4. Because subscription 802 at this point in the example has a priority value higher than subscription 801, RF resource arbitration agent 803 issues a grant signal 826 to subscription 802 at least in part in response to receiving request signal 824. Subscription 802 takes control of the RF resources, and a request signal 816 from subscription 801 results in a denied signal 817 being issued from the arbitration agent 803 to subscription 801. At least in part in response to receiving the denied signal 817, subscription 801 issues a reserve signal 818 for a period of time beginning at time t5. Subscription 801 continues to maintain a priority value of P2, and subscription 802 returns to a priority value of P3 at least in part in response to having received the temporary priority level of P1 for request 824.

The example of FIG. 8 depicting an arbitration bias in favor of subscription 801 is merely one example of adaptive QoS for a dual subscription mode of operation. Of course, a wide variety of arbitration schemes may be implemented in accordance with claimed subject matter, and the scope of claimed subject matter is not limited to any particular arbitration scheme. For example, in some embodiments the arbitration scheme may try to be fair to both subscriptions. Also in some embodiments, the bias in the arbitration scheme between two or more subscriptions may change from among the subscriptions depending on circumstances. In another aspect, if the arbitration scheme is biased in favor of a first subscription, the arbitration may become biased in favor of a second subscription following an expiration of a page period for the first subscription, similar to the situation mentioned above in connection with the example of FIG. 8. Additionally, when the change in bias from the first subscription to the second subscription occurs following the page period for the first subscription may be the next time the second subscription desires to monitor its system. Alternatively, for another example, if it is assumed that the second subscription may have missed a voice page at the time of collision with the page period for the first subscription, the change in bias for the arbitration scheme may take place at a time when it is expected that the network/base station will re-transmit the voice page to the second subscription. Of course, these are merely additional examples of aspects of a priority scheme, and the scope of claimed subject matter is not limited in these respects.

In another aspect, a user may specify a preference among the dual subscriptions. At least in part in response to receiving an input from the user indicating such a preference, a wireless communication device may adjust the arbitration scheme for the dual subscriptions to bias the arbitration scheme in favor of the preferred subscription. This represents another example of adaptive QoS for a dual subscription mode of operation for a wireless communication device.

In an additional aspect, a wireless communication device may receive signals from one or more base stations indicating that one of the two subscriptions is about to or is likely to receive a call. In such a case, one or more QoS parameters may be adjusted to enhance the call performance for that subscription. Similarly, if the mobile station receives information from one or more base stations that the other subscription may soon receive a call, one or more QoS parameters may be adjusted to enhance the call performance for the other subscription. In this manner, the mobile station may attempt to discern which subscription is about to receive a call, and may adjust one or more QoS parameters accordingly.

In a further aspect, a wireless communication device may utilized two phone numbers or subscriptions. For example, one phone number or subscription may by utilized for CDMA2000 1x communications, and another phone number or subscription may be utilized for EV-DO communication. In an aspect, 1x and EV-DO communications may share a single receive chain within a receiver of the wireless communication device. This may be referred to as "hybrid" mode. In an example, monitoring and demodulation of emergency alert communications may not be assigned a highest priority. In an aspect, the priority of emergency alert communications may be raised at least in part in response to a detection of an emergency alert mode of operation.

In a further aspect, 1x communications and EV-DO communications may utilize separate receive chains. This may be referred to as a "simultaneous" mode. In an example implementation, 1x communications may be assigned to a lower performing chain than that utilized for EV-DO communications. In a poor coverage area, for example, 1x communication performance may be degraded, which may result in degraded performance in monitoring and demodulating emergency alert communications.

In an aspect, an algorithm for selecting between a hybrid mode and a simultaneous mode for 1x and EV-DO communications may be utilized. In an example, the determination of whether to utilize hybrid mode or simultaneous mode may be based at least in part on a receive power for 1x communication signals. In another aspect, the algorithm may be threshold based, where an increase in threshold results in more aggressive switching from simultaneous mode to hybrid mode in response to lower receive power for 1x communication signals. In an aspect, the threshold may be raised in response to a detection of an emergency alert mode of operation in order to improve 1x communication performance.

In examples described above, various modes of operation may be detected, and at least in part in response to a detection of a mode of operation, various quality of service parameters may be adjusted. Example modes of operation, as discussed above, may include a frequent calls mode of operation, a dual subscription mode of operation, and/or an emergency alert mode of operation. A determination of a mode of operation may be based at least in part on one or more attributes of an operating environment for a mobile station, in an aspect. Modes of operation may be detected singly, in an aspect. However, in another aspect, two or more modes of operation may be detected concurrently. Priority schemes may allow adjustments of quality of service parameters for one detected mode to have priority over quality of service parameter adjustments for one or more other detected modes of operation, in an example. Additionally, quality of service parameters may be adjusted in accordance with one or more detected modes of operation, as described previously, and may in another aspect be adjusted in accordance not only with the one or more detected modes of operation, but also in accordance with a particular application for a mobile station. That is, a particular mobile station application may benefit from quality of service parameter adjustments that may differ from those for a different application. Thus, a priority scheme for adjusting quality of service parameters may be based at least in part on one or more detected modes of operations, and may also be based at least in part on one or more applications. However, these are merely examples of quality of service parameter priority schemes, and the scope of claimed subject matter is not limited in these respects.

FIG. 9 is a block diagram of an example of a wireless communication device 900 that may be adapted to perform any of the example techniques described herein in connection with FIGS. 1-8. One or more radio transceivers 970 may be adapted to modulate an RF carrier signal with baseband information, such as voice or data, onto an RF carrier, and demodulate a modulated RF carrier to obtain such baseband information. An antenna 972 may be adapted to transmit a modulated RF carrier over a wireless communications link and receive a modulated RF carrier over a wireless communications link.

A baseband processor 960 may be adapted to provide baseband information from a central processing unit (CPU) 920 to transceiver 970 for transmission over a wireless communications link. Here, CPU 920 may obtain such baseband information from an input device within a user interface 910. Baseband processor 960 may also be adapted to provide baseband information from transceiver 970 to CPU 920 for transmission through an output device within user interface 910.

User interface 910 may comprise a plurality of devices for inputting or outputting user information such as voice or data. Such devices may include, by way of non-limiting examples, a keyboard, a display screen, a microphone, and a speaker.

Transceiver 970 may provide demodulated information to correlator 940. Correlator 940 may be adapted to derive pilot-related correlation functions from information relating to pilot signals provided by transceiver 970. This information may be used by wireless communication device 900 to acquire wireless communications services. Channel decoder 950 may be adapted to decode channel symbols received from baseband processor 960 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 950 may comprise a turbo decoder.

A memory 930 may be adapted to store machine-readable instructions which are executable to perform one or more of processes, implementations, or examples thereof which are described or suggested herein. CPU 920 may be adapted to access and execute such machine-readable instructions, thereby enabling wireless communication device 900 to perform one or more of the processes, implementations, and/or examples described and/or suggested above in connection with FIGS. 1-5. Of course, wireless communication device 900 is merely an example, and the scope of claimed subject matter is not limited to the specific configuration of components and/or functional units depicted.

In one or more examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The methodologies described herein may be implemented by various means depending upon applications according to particular examples. For example, as previously mentioned, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
   receiving one or more wireless signals at a user wireless communication device;
   determining one or more attributes of an operating environment for the wireless communication device based at least in part on said one or more wireless signals;
   detecting one or more of a frequent calls mode of operation, a dual subscription mode of operation, and/or an emergency alert mode of operation based at least in part on said one or more determined attributes of the operating environment; and
   adjusting one or more quality of service parameters of the wireless communication device at least in part in response to said detecting said one or more modes of operation.

2. The method of claim 1, wherein said detecting comprises detecting the frequent calls mode of operation.

3. The method of claim 2, wherein said adjusting said one or more quality of service parameters comprises increasing a frequency with which the wireless communication device enables a receiver circuit during an idle state of the wireless communication device at least in part in response to said detecting the frequent calls mode of operation.

4. The method of claim 2, wherein said adjusting one or more parameters comprises increasing a duration of time for which the wireless communication device enables a receiver circuit during an idle state at least in part in response to said detecting the frequent calls mode of operation.

5. The method of claim 2, wherein said adjusting one or more quality of service parameters comprises one or more of:
 exiting a slotted mode of operation into a slotted mode of operation at least in part in response to said detecting the frequent calls mode of operation; and
 invoking one or more demodulation techniques comprising receive diversity and interference cancellation during synch, idle, and/or access states at least in part in response to said detecting the frequent calls mode of operation.

6. The method of claim 1, wherein said detecting comprises detecting the dual subscription mode of operation.

7. The method of claim 6, wherein said adjusting one or more quality of service parameters comprises dynamically adjusting an arbitration priority between two or more subscriptions.

8. The method of claim 7, wherein said adjusting the arbitration priority between said two or more subscriptions comprises determining whether one of the two or more subscriptions is in the frequent calls mode of operation and biasing the arbitration priority in favor of the subscription in the frequent calls mode of operation.

9. The method of claim 7, wherein said adjusting the arbitration priority between said two or more subscriptions comprises biasing the arbitration priority in favor of one of the two or more subscriptions in accordance with a user specification.

10. The method of claim 7, wherein said adjusting the arbitration priority between said two or more subscriptions comprises determining whether one of the two or more subscriptions is likely to enter a call or is in the frequent calls mode of operation and biasing the arbitration priority in favor of the subscription determined to be likely to enter the call or is in the frequent calls mode of operation.

11. The method of claim 7, wherein said adjusting the arbitration priority between said two or more subscriptions comprises biasing the arbitration priority in favor of a first subscription for a first page period, the method further comprising biasing the arbitration priority in favor of a second subscription at least in part in response to an expiration of said first page period.

12. The method of claim 1, wherein said detecting comprises detecting the emergency alert mode of operation.

13. The method of claim 12, wherein said detecting the emergency alert mode of operation comprises detecting the emergency alert mode of operation based at least in part on a recognition of the wireless communication device initiating a call to an emergency response phone number.

14. The method of claim 12, wherein said adjusting said one or more quality of service parameters comprises increasing signal transmission power for an emergency alert call.

15. The method of claim 12, wherein said adjusting said one or more quality of service parameters comprises invoking one or more enhanced demodulation techniques.

16. The method of claim 12, wherein said adjusting said one or more quality of service parameters comprises elevating a priority for modulating and/or demodulating emergency alert communications if a 1× subscription and a separate EV-DO subscription share a receive chain.

17. The method of claim 12, wherein said adjusting said one or more quality of service parameters comprises raising a threshold for an algorithm to switch from a simultaneous mode to a hybrid mode, wherein the simultaneous mode comprises utilizes a first receive chain for 1× communication and a second receive chain for EV-DO communication, and wherein the hybrid mode utilizes a single receive chain for both 1× and EV-DO communication, and further wherein said raising said threshold results in a more aggressive switching from simultaneous mode to hybrid mode in response to 1× communication received signal power.

18. The method of claim 1, further comprising adjusting one or more QoS parameters at least in part in response to a battery charge falling below a specified threshold.

19. The method of claim 18, wherein said adjusting the one or more QoS parameters at least in part in response to the battery charge falling below the specified threshold comprises disabling one or more receive chains to reduce power consumption.

20. A user wireless communication device, comprising:
 a receiver to receive one or more wireless signals at the wireless communication device; and
 a processor to determine one or more attributes of an operating environment for the wireless communication device based at least in part on said one or more wireless signals, the process further to detect one or more of a frequent calls mode of operation, a dual subscription mode of operation, and/or an emergency alert mode of operation based at least in part on said one or more determined attributes of the operating environment, and the processor further to adjust one or more quality of service parameters of the wireless communication device at least in part in response to said detecting said one or more modes of operation.

21. The wireless communication device of claim 20, the processor to detect said one or more modes of operation at least in part by detecting the frequent calls mode of operation.

22. The wireless communication device of claim 21, the processor to adjust said one or more quality of service parameters at least in part by increasing a frequency with which the wireless communication device enables a receiver circuit during an idle state of the wireless communication device at least in part in response to the processor detecting the frequent calls mode of operation.

23. The wireless communication device of claim 21, the processor to adjust said one or more parameters at least in part by increasing a duration of time for which the wireless communication device enables a receiver circuit during an idle state at least in part in response to said detecting the frequent calls mode of operation.

24. The wireless communication device of claim 21, the processor to adjust said one or more quality of service parameters at least in part by:
 exiting a slotted mode of operation into a slotted mode of operation at least in part in response to the processor detecting the frequent calls mode of operation; and/or
 invoking one or more demodulation techniques comprising receive diversity and interference cancellation during synch, idle, and/or access states at least in part in response to the processor detecting the frequent calls mode of operation.

25. The wireless communication device of claim 20, the processor to detect said one or more modes of operation at least in part by detecting the dual subscription mode of operation.

26. The wireless communication device of claim 25, the processor to adjust said one or more quality of service parameters at least in part by dynamically adjusting an arbitration priority between two or more subscriptions.

27. The wireless communication device of claim 26, the processor to adjust the arbitration priority between said two or more subscriptions at least in part by determining whether one of the two or more subscriptions is in the frequent calls mode of operation and biasing the arbitration priority in favor of the subscription in the frequent calls mode of operation.

28. The wireless communication device of claim 26, the processor to adjust the arbitration priority between said two or more subscriptions at least in part by biasing the arbitration priority in favor of one of the two or more subscriptions in accordance with a user specification.

29. The wireless communication device of claim 26, the processor to adjust the arbitration priority between said two or more subscriptions at least in part by determining whether one of the two or more subscriptions is likely to enter a call or is in the frequent calls mode of operation and biasing the arbitration priority in favor of the subscription determined to be likely to enter the call or is in the frequent calls mode of operation.

30. The wireless communication device of claim 26, the processor to adjust the arbitration priority between said two or more subscriptions at least in part by biasing the arbitration priority in favor of a first subscription for a first page period, the processor further to bias the arbitration priority in favor of a second subscription at least in part in response to an expiration of said first page period.

31. The wireless communication device of claim 20, the processor to detect said one or more modes of operation at least in part by detecting the emergency alert mode of operation.

32. The wireless communication device of claim 31, the processor to detect the emergency alert mode of operation based at least in part on a recognition of the mobile station initiating a call to an emergency response phone number.

33. The wireless communication device of claim 31, the processor to adjust said one or more quality of service parameters at least in part by increasing a signal transmission power for an emergency alert call.

34. The wireless communication device of claim 31, the processor to adjust said one or more quality of service parameters at least in part by invoking one or more enhanced demodulation techniques.

35. The wireless communication device of claim 31, the processor to adjust said one or more quality of service parameters at least in part by elevating a priority for modulating and/or demodulating emergency alert communications if a 1× subscription and a separate EV-DO subscription share a receive chain.

36. The wireless communication device of claim 31, the processor to adjust said one or more quality of service parameters at least in part by raising a threshold for an algorithm to switch from a simultaneous mode to a hybrid mode, wherein the simultaneous mode comprises utilizes a first receive chain for 1× communication and a second receive chain for EV-DO communication, and wherein the hybrid mode utilizes a single receive chain for both 1× and EV-DO communication, and further wherein said raising said threshold results in a more aggressive switching from simultaneous mode to hybrid mode in response to 1× communication received signal power.

37. The wireless communication device of claim 20, the processor further to adjust one or more QoS parameters at least in part in response to a battery charge falling below a specified threshold.

38. The wireless communication device of claim 37, the processor to adjust one or more QoS parameters in response to the battery charge falling below the specified threshold at least in part by disabling one or more receive chains to reduce power consumption.

39. An apparatus, comprising:
means for receiving one or more wireless signals at a user wireless communication device;
means for determining one or more attributes of an operating environment for a wireless communication device based at least in part on said one or more wireless signals;
means for detecting one or more of a frequent calls mode of operation, a dual subscription mode of operation, and/or an emergency alert mode of operation based at least in part on said one or more determined attributes of the operating environment; and
means for adjusting one or more quality of service parameters of the wireless communication device at least in part in response to said detecting said one or more modes of operation.

40. The apparatus of claim 39, wherein said means for detecting comprises means for detecting the frequent calls mode of operation, and wherein said means for adjusting said one or more quality of service parameters comprises means for increasing a frequency with which the wireless communication device enables a receiver circuit during an idle state of the wireless communication device at least in part in response to said detecting the frequent calls mode of operation.

41. The apparatus of claim 39, wherein said means for detecting comprises means for detecting the dual subscription mode of operation, and wherein said means for adjusting one or more quality of service parameters comprises means for dynamically adjusting an arbitration priority between two or more subscriptions.

42. The apparatus of claim 39, wherein said means for detecting comprises means for detecting the emergency alert mode of operation, and wherein said means for detecting the emergency alert mode of operation comprises means for detecting the emergency alert mode of operation based at least in part on a recognition of the wireless communication device initiating a call to an emergency response phone number.

43. The apparatus of claim 42, wherein said means for adjusting said one or more quality of service parameters comprises means for increasing signal transmission power for an emergency alert call.

44. The apparatus of claim 39, further comprising means for adjusting one or more QoS parameters at least in part in response to a battery charge falling below a specified threshold.

45. An article, comprising:
a storage medium having stored thereon instructions executable by a user wireless communication device to:
receive one or more wireless signals;
determine one or more attributes of an operating environment for the wireless communication device based at least in part on said one or more wireless signals;
detect one or more of a frequent calls mode of operation, a dual subscription mode of operation, and/or an emergency alert mode of operation based at least in part on said one or more determined attributes of the operating environment; and
adjust one or more quality of service parameters of the wireless communication device at least in part in response to said detecting said one or more modes of operation.

46. The article of claim 45, wherein the storage medium has stored thereon further instructions executable by the wireless communication device to:

detect said one or more modes of operation at least in part by detecting the frequent calls mode of operation; and adjust said one or more quality of service parameters at least in part by increasing a frequency with which the wireless communication device enables a receiver circuit during an idle state of the wireless communication device at least in part in response to said detecting the frequent calls mode of operation.

47. The article of claim 46, wherein the storage medium has stored thereon further instructions executable by the wireless communication device to adjust said one or more quality of service parameters at least in part by:

exiting a slotted mode of operation into a slotted mode of operation at least in part in response to said detecting the frequent calls mode of operation; and/or invoking one or more demodulation techniques comprising receive diversity and interference cancellation during synch, idle, and/or access states at least in part in response to said detecting the frequent calls mode of operation.

48. The article of claim 45, wherein the storage medium has stored thereon further instructions executable by the wireless communication device to:

detect said one or more modes of operation at least in part by detecting the dual subscription mode of operation; and adjust said one or more quality of service parameters at least in part by dynamically adjusting an arbitration priority between two or more subscriptions.

49. The article of claim 48, wherein the storage medium has stored thereon further instructions executable by the wireless communication device to adjust the arbitration priority between said two or more subscriptions at least in part by determining whether one of the two or more subscriptions is in the frequent calls mode of operation and by biasing the arbitration priority in favor of the subscription in the frequent calls mode of operation.

50. The article of claim 45, wherein the storage medium has stored thereon further instructions executable by the wireless communication device to:

detect said one or more modes of operation at least in part by detecting the emergency alert mode of operation based at least in part on a recognition of the wireless communication device initiating a call to an emergency response phone number; and adjust said one or more quality of service parameters at least in part by increasing signal transmission power for an emergency alert call.

* * * * *